US009567521B2

(12) United States Patent
Uehara (10) Patent No.: US 9,567,521 B2
(45) Date of Patent: Feb. 14, 2017

(54) METHOD OF PRODUCING IRON POWDER FOR TREATING HALOGENATED ORGANIC COMPOUND AND METHOD OF CLEANING CONTAMINATED SOIL OR GROUNDWATER (75) Inventor: Taishi Uehara, Tokyo (JP)

(73) Assignee: DOWA ECO SYSTEM CO., LTD., Tokyo (JP)

(*) Notice: Subject to any disclaimer, the term of this patent is extended or adjusted under 35 U.S.C. 154(b) by 614 days.

(21) Appl. No.: 13/979,934

(22) PCT Filed: Jan. 17, 2012

(86) PCT No.: PCT/JP2012/050795
§ 371 (c)(1),
(2), (4) Date: Oct. 4, 2013

(87) PCT Pub. No.: WO2012/099094
PCT Pub. Date: Jul. 26, 2012

(65) Prior Publication Data
US 2014/0030431 A1 Jan. 30, 2014

(30) Foreign Application Priority Data
Jan. 17, 2011 (JP) .................................. 2011-007318

(51) Int. Cl.
C09K 17/00 (2006.01)
B09C 1/00 (2006.01)
(Continued)

(52) U.S. Cl.
CPC ............... *C09K 17/00* (2013.01); *B09C 1/002* (2013.01); *B09C 1/08* (2013.01); *B22F 1/0055* (2013.01);
(Continued)

(58) Field of Classification Search
None
See application file for complete search history.

(56) References Cited

U.S. PATENT DOCUMENTS

| 5,911,882 A * | 6/1999 | Benjamin | ................ B01J 20/06 210/679 |
| 2009/0054718 A1* | 2/2009 | Kamada | ................ B01J 27/055 588/316 |
| 2009/0087557 A1* | 4/2009 | Kawano | .................... B22F 1/02 427/216 |

FOREIGN PATENT DOCUMENTS

| JP | A-11-235577 | 8/1999 |
| JP | A-2000-005740 | 1/2000 |

(Continued)

OTHER PUBLICATIONS

International Search Report issued in International Application No. PCT/JP2012/050795 dated Apr. 17, 2012.

*Primary Examiner* — Shamim Ahmed
*Assistant Examiner* — Bradford Gates
(74) *Attorney, Agent, or Firm* — Oliff PLC (57) ABSTRACT There is provided iron powder having a halogenated organic compound treating performance equivalent to or higher than that of a material for treating halogenated organic compounds, although an environmental load substance such as copper is not contained, and a method of producing iron powder for treating halogenated organic compounds including: immersing the iron powder in one or more kinds of solvents selected from water and organic solvents which have lower vapor pressure than water and contain oxygen; performing solid-liquid separation for the iron powder immersed in the solvent, to thereby obtain the iron powder wet by this solvent; and applying drying treatment to the iron powder wet in the solvent, while keeping a temperature at less than 40° C.

9 Claims, 4 Drawing Sheets (51) Int. Cl.
  *B09C 1/08* (2006.01)
  *C02F 1/70* (2006.01)
  *B22F 1/00* (2006.01)
  *B22F 1/02* (2006.01)

(52) U.S. Cl.
  CPC ............... *B22F 1/0059* (2013.01); *B22F 1/02* (2013.01); *C02F 1/705* (2013.01)

(56) References Cited

FOREIGN PATENT DOCUMENTS

| | | |
|---|---|---|
| JP | A-2002-069425 | 3/2002 |
| JP | A-2002-316050 | 10/2002 |
| JP | A-2003-339902 | 12/2003 |
| JP | A-2009-235204 | 10/2009 |

* cited by examiner

METHOD OF PRODUCING IRON POWDER FOR TREATING HALOGENATED ORGANIC COMPOUND AND METHOD OF CLEANING CONTAMINATED SOIL OR GROUNDWATER

TECHNICAL FIELD

The present invention relates to a method of producing iron powder for treating halogenated organic compounds contained in soil or underground water, and a method of cleaning contaminated soil or groundwater.

DESCRIPTION OF RELATED ART

Halogenated organic compounds represented by trichloroethylene (TCE) and tetrachloroethylene (PCE), etc., is used as a solvent for defatting of electronic parts or drycleaning. Then, in order to clean the soil contaminated by the halogenated organic compounds or cis-1, 2-dichloro ethylene (cis-1, 2-DCE), etc., generated by dechlorinating the above-mentioned halogenated organic compounds by a microorganism in the soil, various techniques have been developed and are put to practical use.

For example, patent document 1 proposes a technique of effectively decomposing trichloroethylene, etc., in the soil, by mixing iron powder containing 0.1 wt % or more of carbon (C) into the soil contaminated by the halogenated organic compounds such as trichloroethylene, etc., in a specific area of 500 cm$^2$/g or more.

Patent document 2 proposes as follows: high purity iron powder (C-content: less than 0.1 mass, Si-content: ess than 0.25 mass %, Mn-content: less than 0.60 mass %, P-content: less than 0.03 mass %, S-content: less than 0.03 mass %, O-content: less than 0.5 mass %), is effective for cleaning the soil or water contaminated by a hardly decomposable halogenated organic compounds such as cis-1, 2-dichloroethylene (cis-1, 2-DCE), etc.

An applicant of the present application discloses a copper-containing iron powder in which metal copper is precipitated on a surface of an iron powder particle, in patent document 3, patent document 4, and patent document 5, and also discloses as follows: if the copper-containing iron powder is added and mixed into the soil or the underground water, etc., contaminated by the halogenated organic compounds, the halogenated organic compounds can be efficiently decomposed.

PRIOR ART DOCUMENT

Patent Document
Patent Document 1:
Japanese Patent Publication Laid Open No. 11-235577
Japanese Patent Publication Laid Open No. 2002-316050
Japanese Patent Publication Laid Open No. 2000-005740
Japanese Patent Publication Laid Open No. 2002-069425
Japanese Patent Publication Laid Open No. 2003-339902

SUMMARY OF THE INVENTION

Problem to be Solved by the Invention

As described above, as a result of strenuous efforts by inventors of the present invention for developing the technique of reducing a contamination concentration by dechlorinating the halogenated organic compounds, it is found that an important object is to produce a decomposer with high power of decomposing the halogenated organic compounds being a contamination substances, as a technical element of such a technical development. It is also found that there is a powder mainly composed of the iron powder and iron, as a typical example of the decomposer.

Further, it is found by the inventors of the present invention, that an overall step can be simplified by omitting a copper adding step in a production step by not adding an environmental load substance such as copper, to the iron powder for decomposing the above-mentioned halogenated organic compounds, and a soil cleaning treatment agent can be obtained, with low environmental load and not allowing copper, etc., to be remained in the soil after soil cleaning construction.

In view of the above-mentioned circumstance, the present invention is provided, and an object of the present invention is to provide an iron powder having a halogenated organic compound treating performance equivalent to or higher than that of an halogenated organic compound treating material produced by a conventional technique, although the iron powder does not contain the environmental load substances such as copper, and further provide a method of cleaning the contamination of the soil/underground water, using the iron powder.

Means for Solving the Problem

It is found by the inventors of the present invention, that a decomposition power for the halogenated organic compounds of the iron powder can be considerably improved by immersing the iron powder in one or more kinds of solvents selected from water and organic solvents which have lower vapor pressure than water and contain oxygen, and thereafter performing solid-liquid separation for the iron powder immersed in the solvent to thereby obtain the iron powder wet by this solvent, and applying drying treatment to the obtained iron powder while keeping a temperature at less than 40° C.

Namely, in order to solve the above-mentioned problem, a first invention provides a method of producing iron powder for treating halogenated organic compounds, including:

immersing iron powder in one or more kinds of solvents selected from water and organic solvents which have lower vapor pressure than water and contain oxygen;

performing solid-liquid separation for the iron powder immersed in the solvent, to thereby obtain the iron powder wet by this solvent; and applying drying treatment to the iron powder wet in the solvent, while keeping a temperature at less than 40° C.

A second invention provides the method of producing iron powder for treating halogenated organic compounds according to the first invention, wherein the drying treatment is performed while keeping the temperature at 0° C. or more and 10° C. or less.

A third invention provides the method of producing iron powder for treating halogenated organic compounds according to the first or second invention, wherein immersing the iron powder in one or more kinds of solvents selected from the water, and the organic solvents which have lower vapor pressure than water and contain oxygen, is performed after applying oxygen treatment to the iron powder.

A fourth invention provides the method of producing iron powder for treating halogenated organic compounds according to any one of the first to third inventions, wherein the drying treatment is performed for 0.1 hours or more and 72 hours or less.

A fifth invention provides the method of producing iron powder for treating halogenated organic compounds according to any one of the first to third inventions, wherein the drying treatment is performed until a solvent weight is 0.5 mass % or less of an iron powder weight.

A sixth invention provides the method of producing iron powder for treating halogenated organic compounds according to any one of the first to fifth inventions, wherein iron powder having an average particle size of 1 μm or more and 500 μm or less, is used as the iron powder.

A seventh invention provides the method of producing iron powder for treating halogenated organic compounds according to any one of the first to sixth inventions, wherein iron powder with each particle having a flat shape with a flat ratio of 2 or more is used.

An eighth invention provides a method of cleaning soil/underground water, wherein the iron powder produced by the method of producing iron powder for treating halogenated organic compounds of any one of the first to seventh inventions, is used.

Advantage of the Invention

According to the present invention, iron powder for treating halogenated organic compounds not containing additives such as copper, and having high decomposition power for decomposing halogenated organic compounds, can be obtained.

MODES FOR CARRYING OUT THE INVENTION (1) Iron Powder being a Raw Material

Iron powder used for producing the iron powder for treating halogenated organic compounds according to the present invention, has a particulate shape. Composition of the iron powder is not particularly limited, provided that the iron powder is mainly composed of iron. However, preferably a total content of iron is 80 mass % or more and content of metal iron is 75 mass % or more. Further, in order to reduce an environmental load, it is desirable to use the iron powder not containing a component such as chromium or lead being a secondary contamination source.

Specifically, previously produced iron powder, for example reducing iron powder produced from an ore by reduction or atomizing iron powder produced by atomizing, can be used. Then, if the iron powder thus produced has a particle size of a previously desired size, adjustment of the particle size is not required in a producing step, and this is preferable. Specifically, the average particle size of the iron powder is preferably 1 μm or more and 500 μm or less.

As a preferable example of the iron powder, reducing iron powder DKP-100 produced by DOWA IP Creation can be given.

Here, table 1 shows analysis results of chemical components of the reducing iron powder DKP-100. Table 2 shows physical property values described later. Note that a particle size distribution of table 2 shows an evaluation result by laser diffractometry. $D_{10}$ to $D_{90}$ indicate a particle diameter cumulative distribution. A particle size cumulative curve is plotted, with weight percentage (%) of the iron powder taken on the vertical axis, and a particle size taken on the horizontal axis indicated by logarithmic scale, and from this graph, the weight percentage 50% of the particle size is defined as $D_{50}$ (50% particle size). $D_{10}$ and $D_{90}$ are also obtained by calculation through a similar procedure.

TABLE 1

| Total Fe (wt %) | Metal Fe (wt %) | FeO (wt %) | S (wt %) | C (wt %) | Cu (mg/kg) | Cr (mg/kg) | Pb (mg/kg) |
|---|---|---|---|---|---|---|---|
| 97.4 | 93.6 | 4.9 | 0.01 | 0.07 | 330 | 63 | 28 |

From table 1, it is found that a sufficiently small amount of chromium and lead are contained in the iron powder of the present invention, which is not a secondary contamination source. Although a larger amount of copper than chromium and lead is contained, this is a problem-free level legally at least for domestic use in Japan, because 0.1 wt % or more of copper is contained in the iron powder for treating halogenated organic compounds of a conventional technique, to thereby improve the effect of decomposing the chlorine organic compounds, and a reference value of Cu-content in an aglicultural land is set to 125 mg/kg.

Further, the copper-content in the iron powder of the present invention is under ⅓ of the copper content in the iron powder for treating halogenated organic compounds of the conventional technique, and this is a proof of the fact that owing to the iron powder of the present invention, the halogenated organic compounds are decomposed by a mechanism different from the mechanism of the iron powder based on the conventional technique.

(2) Flattening Processing Applied to the Iron Powder

Preferably, flattening processing is previously applied to the iron powder being the raw material, to thereby obtain a flat-shaped iron powder with a flat ratio of 2 or more. The flattening processing is performed by deforming the particle of the iron powder into a flat shape, by adding an impact and/or a pressure to a mixed material of the iron powder raw material and water.

The impact and/or the pressure is added to the mixed material of the iron powder raw material and water by applying plastic deformation processing thereto using a pulverizer. As the pulverizer, a "medium stirring type mill" which carries out pulverization while stirring an impact medium (namely media) which is accommodated in a vessel, and specifically an attritor or a ball mill is preferable. This is because the ball mill or the attritor is suitable for the pulverization of fine powder, thus easily controlling the impact or the pressure, to thereby easily obtain the flat iron powder having a desired particle size distribution. When the ball mill is used, a rotation drive-type or a vibration drive-type ball mill can be used.

When the plastic deformation processing is performed using the above-mentioned attritor or the ball mill, etc., a prescribed vessel is filled with the iron powder raw material and water (for example, deionized water, industrial water, and tap water, etc.) together with the above-mentioned media. Then, the iron powder raw material is deformed or pulverized by rotating the vessel for example.

For example, when a rotary ball mill is used to perform plastic deformation processing, the media and the iron powder raw material are charged into a processing pot (porcelain or stainless pot, etc., is used), so that rotation processing is performed.

An object of charging water into the prescribed vessel, is to make a uniform and efficient contact between the iron powder and the media. Accordingly, for example, in order to improve a dispersion state of the iron powder in the prescribed vessel, or in order to perform surface treatment for an iron particle, not only the water, but also the medium such as an organic solvent, oil component, or each kind of solution, etc., may be simultaneously charged.

Oxygen dissolved in the water or remained in a head space, exists in the atmosphere of the processing pot. The oxygen may exist there at it is, or may be removed by bubbling inert gas such as nitrogen, thereby preferably preventing excessive oxidation of the iron powder.

In the flattening processing, a processing amount per batch is increased by setting a high filling ratio of (iron powder raw material/media). Meanwhile, by setting a low filling ratio of (iron powder raw material/media), processing efficiency per unit time is increased. Therefore, the filling ratio of (iron powder raw material/media) is preferably adjusted, according to requested properties of the iron powder and processing amount.

For example, when the rotation drive-type flattening processing is performed using the rotary ball mill, by appropriately keeping the number of rotations, the iron powder and the media are turned into a lamb in the pot without moving, and a sufficient impact and/or pressure is added to the iron powder particle between media. In order to realize such a state, a rotational speed is preferably set so that the above-mentioned number of rotations is controlled, to thereby keep a dispersion state of the iron powder and the media, and repeat rise and drop of the iron powder and the media along an inner wall of the pot. As a proper rotational speed of the rotary ball mill, the number of rotations allowing the above-mentioned state to be realized, is preferably obtained, depending on a volume of the pot and a filling condition of the iron powder and the media.

For example, when the flattening processing is performed using the attritor, the processing efficiency is improved by increasing a filling amount of the iron powder and the media, and increasing the number of rotations of a stirring blade. Therefore, it is appropriate to set the filling amount and the number of rotations at a level of not overflowing the iron powder and the media from the vessel. Since the iron powder has a large specific gravity, it is preferable that the processing efficiency is improved by adjusting the number of rotations so that the iron powder and the media don't stay at a bottom part of the vessel but are circulated in the vessel, or by making a circulation so that a slurry containing the iron powder is extracted from a lower part and is returned to an upper part.

A proper condition may be set for the processing time of the flattening processing, by evaluating a decomposition performance of the obtained halogenated organic compound and physical properties correlated to the halogenated organic compound decomposition performance. As physical evaluation items correlated to the halogenated organic compound decomposition performance, a specific area and a particle size distribution, etc., can be given. Then, the iron powder thus subjected to the flattening processing, is flattened and pulverized.

A structure of an inner part of the iron powder before deformation is easily exposed, on the surface of the iron powder in which each particle is deformed by adding the impact or the pressure to the iron powder raw material, and is turned into the flat shape having the flat ratio of 2 or more.

The mixture of the iron powder, media, and water was taken out after the plastic deformation processing, and the media, and a mixture slurry of the iron powder/water were separated from each other, to thereby obtain the iron powder. The obtained iron powder was dried at less than 40° C., to thereby obtain the iron powder having the flat shape. Drying was preferably performed for 0.1 to 72 hours.

(3) Permeation/Immersion Processing of Solvent into the Iron Powder

One or more kinds of the solvents selected from water, and an organic solvent having a lower steam pressure than water and containing oxygen, are permeated into the iron powder described in the above-mentioned (1) to (2).

Here, methanol, ethanol, propanol, acetone, toluene, etc., can be given as the organic solvents having the lower steam pressure than water and containing oxygen. Above all, methanol and ethanol are more preferable than propanol, acetone, and toluene.

In order to permeate the solvents into the iron powder of the present invention, the iron powder may be immersed in the solvents, or the solvents may be injected or sprinkled into the accumulated iron powder.

The surface of the iron powder obtained after the above-mentioned step (3) is moderately oxidized. However, in order to suppress an excessive oxidation, for example dilute hydrochloric acid treatment is performed before the above-mentioned step (3), or the above-mentioned step (3) is performed in an inert atmosphere (for example, nitrogen), to thereby prevent a progress of the oxidation of the particle surface due to handling under the atmospheric air.

(4) Solid-Liquid Separation Step of the Iron Powder

The iron powder immersed in the solvent is subjected to solid-liquid separation, to thereby obtain the iron powder wet in the solvent. Specifically, for example, the iron powder permeated in the solvent, is set on a filter paper and can be subjected to the solid-liquid separation. When the solid-liquid separation by the filter paper is performed, preferably suction filtering is utilized together, to thereby increase productivity.

As a result of the solid-liquid separation, the iron powder and the solvent are separated from each other, to thereby obtain the iron powder separated into solid-liquid so as not allow the solvent to drop, although the iron powder is wet in the solvent.

(5) Drying Step of the Iron Powder

Drying is performed to dry the iron powder thus separated into solid-liquid, while keeping the temperature to less than 40° C. (preferably 30° C. or less, and most preferably 0° C. or more and 10° C. or less). Drying is preferably performed for 0.1 to 72 hours. Further, drying is preferably performed in the atmospheric air or in an atmosphere with lower oxygen gas concentration than the oxygen gas concentration in the atmospheric air.

In drying, a solvent amount in the iron powder is set to 0.5 mass % or less of a pure iron powder weight.

The iron powder after drying is in a slight cohesion state, and therefore the iron powder in the cohesion state is pulverized without adding a large impact thereto, to thereby obtain the iron powder for treating halogenated organic compounds according to the present invention. Mortar and a sample mill, etc., can be used for the pulverization. The pulverization is performed for easy handling, so as to improve a dispersability of the particles, and therefore there is no large influence even if not executing the pulverization, provided that remarkable cohesion or adherence of the iron powder does not occur under a condition of an experiment or execution.

Regarding the iron powder after the above-mentioned drying, the surface of the iron particle constituting the iron powder, is in a moderate oxidation state. Therefore, it can be considered that an excellent decomposition power of the halogenated organic compounds can be exhibited.

Accordingly, a preferable execution method of spraying the iron powder of the present invention includes, executing the above-mentioned drying in an execution site, and sprinkling the iron powder over the soil, which is the iron powder of the present invention in the above-mentioned dry state.

In addition, steps up to the above-mentioned drying step can be completed at a place different from an execution place, provided that the surface of the iron particle is set in a desired oxidation state. However, the obtained iron powder of the present invention can be vacuum-sealed, and can be stored or transferred while maintaining the oxidation state of the iron powder.

EXAMPLES

The present invention will be more specifically described hereafter, with reference to the drawings.

Example 1

100 mL of distilled water and 10 g of iron powder (reducing iron powder DKP-100 produced by DOWA IP Creation, shown in tables 1 and 2) were charged into a glass beaker having a volume of 200 mL, and thereafter were stirred for 5 minutes using a Kemi stirrer. The obtained mixture of the iron powder and water was subjected to suction-filtering using a Nutsche, a filtering bottle, and an aspirator, to thereby filter the ion powder on the filtering paper. In such a suction-filtering, the filtering paper of No. 5C type produced by ADVANTEC CORPORATION was used. Then, the aspirator after such a suction-filtering was stopped, and the iron powder on the filtering paper was recovered, to thereby obtain iron powder A.

Water content in the iron powder was 17%.

Note that the water content was set as a water amount vaporized or desorbed from an iron powder sample under a condition of atmospheric pressure and 110° C., and was defined as "water content=contained water weight/iron powder weight in a state of containing water".

Here, the contained water weight was obtained from a difference between the iron powder weight in a state of containing the water, and the iron powder weight in a bone dried state under a condition that the iron powder in the state of containing the water was set in a circulation-type drying machine in a static state, with the temperature set to 110° C. for 12 hours or more.

Aspirator suction was stopped once after the suction-filtering was performed by a similar adjustment method as the adjustment method for the above-mentioned iron powder A. Then, 50 mL of ethanol was permeated in the iron powder on the filtering paper and was set in the static state for 1 minute, to thereby sufficiently permeate the ethanol in the iron powder. Here, the aspirator suction was restarted, and the aspirator was stopped after suction of the ethanol from the iron powder, and the iron powder on the filtering paper was recovered, to thereby obtain iron powder B.

Ethanol content in the iron powder B was 14%.

The recovered iron powders A, B were respectively set in the drying machine with the temperature set to 30° C. under the atmospheric air in the static state, and drying was performed for 24 hours. Then, after drying, the lump resulting from cohesion of the obtained iron powders A, B was respectively slightly pulverized using the mortar, to thereby obtain iron powder samples A, B of this example.

Water content of the iron powder sample A after drying was 0.2%, and water content of B was 0.2%. The plate ratio was 1.29 in both A and B.

The plate ratio of the iron powder sample was obtained by the following formula. Note that an average planar diameter was obtained by measuring long diameters in a fan planar direction and short diameters orthogonal thereto regarding fifty particles, to thereby obtain planar diameters=(long diameters+short diameters)/2, and averaging the planer diameters. An average thickness was obtained by measuring the thicknesses of fifty particles, and averaging these thicknesses.

Average diameter of iron powder particles=(2×average planer diameter+average thickness)/3

Plate ratio of the iron powder particles=average planar diameter/average thickness As described above, the water content was defined by a water amount vaporized or desorbed from the iron powder sample under the condition of the atmospheric pressure at 110° C. The water content was measured using a Karl Fischer Moisture Titrate (MKC-520 produced by KYOTO ELECTRONICS Manufacturing Co., LTD.).

<Evaluation Test> cis-DCE decomposition test was performed using the obtained iron powder samples A, B.

First, 0.5 g of the obtained iron powder samples A, B of example 1 was respectively put in a vial having a volume of 124 mL together with 50 mL of deionized water, and bubbling of the nitrogen gas was performed so that aeration/nitrogen substitution was performed, and thereafter the vial was sealed by a septum made of butyl rubber coated with fluororesin (Teflon (registered trademark)), and an aluminum cap.

Subsequently, 1 µL of cis-1,2-dichloroethylene (cis-1,2-DCE) was injected into each sealed bottle using a microsyringe. Further, 1 µL of benzene was similarly injected using the microsyringe, into each sealed bottle as an internal reference substance for evaluating a variation of a DCE concentration. The concentration of the DCE was traced with elapse of time until $15^{th}$ days of the test, while shaking the bottle at 150 rpm, to thereby obtain a decomposition rate constant k.

The decomposition reaction of the chlorine organic compound by the iron powder sample, is assumed to be a primary reaction expressed by (formula 1), and the decomposition reaction rate constant is defined as k.

$$C/C_0 = e^{-k \cdot t} \qquad \text{(Formula 1)}$$

($C_0$: chlorine organic compound initial concentration, C: concentration of the chlorine organic compound at time t, t: processing time [day], k: decomposition reaction rate constant [day$^{-1}$])

As a result, it was found that the decomposition reaction rate constant of cis-DCE of the iron powder sample A (immersed in distilled water) was 0.064 [day$^{-1}$], and the decomposition reaction rate constant of cis-DCE of the iron powder sample B (immersed in ethanol) was 0.082 [day$^{-1}$].

Example 2

100 mL of hydrochloric acid having 1 mol % concentration was prepared in a glass beaker having a volume of 200 mL, and 10 g of iron powder (reducing iron powder DKP-100 produced by DOWA IP Creation) was charged into the glass beaker, and was stirred for 5 minutes using the Kemi stirrer. The obtained mixture of the iron powder and water was subjected to suction-filtering using the Nutsche, the filtering bottle, and the aspirator, to thereby filter the ion powder on the filtering paper. In such a suction-filtering, the filtering paper of No. 5C type produced by ADVANTEC CORPORATION was used. Then, after suction-filtering of the hydrochloric acid solution from the iron powder, the iron powder was immersed in 200 mL of the deionized water while maintaining a suction state, to thereby wash the iron powder. After end of the wash, the suction-filtering was ended, to thereby obtain the iron powder of this example. Table 2 shows physical values.

TABLE 2

| | BET | Bulkdensity | Particle size distribution [μm] | | |
|---|---|---|---|---|---|
| | [m$^2$/g] | [g/cm$^3$] | D10 | D50 | D90 |
| Iron powder raw material | 0.30 | 2.72 | 85.8 | 169.3 | 280.2 |
| Example 2 | 3.09 | 0.92 | 49.1 | 117.8 | 214.5 |
| Example 4 | 2.52 | 0.92 | 3.4 | 5.18 | 11.14 |

The water content of the iron powder was 17%.

Similarly to example 1, the water content of the iron powder sample was 0.2% after being dried at 30° C. The plate ratio was 1.61.

As a result of performing the cis-DCE decomposition test similar to that of the example 1, it was found that the decomposition reaction rate constant of cis-DCE of the iron powder sample of this example, was 0.038 [day$^{-1}$].

Comparative Example 1 cis-DCE decomposition test described in examples 1 and 2, was performed using the iron powder as it was (reducing iron powder DKP-100 produced by DOWA IP Creation) as the raw material in examples 1 and 2, without performing immersion and drying.

The water content of the iron powder was 0.1%. The plate ratio was 1.42. As a result of the cis-DCE decomposition test, the decomposition reaction rate constant of cis-DCE of the iron powder sample of this example was less than 0.01 [day$^{-1}$], and almost no detectable decomposition could be observed.

Comparative Example 2

The cis-DCE decomposition test described in examples 1 and 2, was performed using a sponge-like iron powder sample as it was (table 3 shows physical values, and table 4 shows analytical values of a chemical component.) without performing immersion and drying.

The water content of the iron powder was 0.2%. The plate ratio was 1.07. As a result of the cis-DCE decomposition test, the decomposition reaction rate constant of cis-DCE of the iron powder sample of this example was less than 0.01 [day$^{-1}$], and almost no detectable decomposition could be observed.

TABLE 3

| BET | Bulk density | Particle size distribution [mass %] | | | | | | |
|---|---|---|---|---|---|---|---|---|
| [m$^2$/g] | [g/cm$^3$] | ~180 μm | ~150 μm | ~106 μm | ~75 μm | ~63 μm | ~45 μm | −45 μm |
| 2.52 | 2.05 | 3.4 | 5.2 | 11.1 | 11.4 | 7.9 | 17.1 | 43.9 |

TABLE 4

| Chemical component [mass %] | | | |
|---|---|---|---|
| Metal Fe | C | S | O |
| 87.1 | 0.27 | 0.019 | 3.07 |

Example 3

Zirconia (ZrO$_2$) ball having a diameter of 10 mm was charged into a SUS304 pot having an internal volume of 2.3 L, by 80 volume % portion of the volume of the pot (by 6580 g). Then, 100 g of the iron powder (the reducing iron powder DKP-100) was charged thereinto, and thereafter 1 L of distilled water was further charged thereinto, and the SUS pot was sealed by a rubber seal-attached lid, to thereby prepare a material.

The SUS pot into which the material was prepared, was placed on a pot mill rotation table, which was then driven and rotated at number of rotations of 120 rpm for 20 hours.

After end of the rotation, contents in the SUS pot were taken out, and the ZrO$_2$ ball was separated from a mixture slurry of the iron powder and water using a filter having an opening size of 5 mm.

The obtained mixture slurry of the iron powder and water was subjected to suction-filtering using the Nutsche, the filtering bottle, and the aspirator, to thereby filter the ion powder on the filtering paper. In such a suction-filtering, the filtering paper of No. 5C type produced by ADVANTEC CORPORATION was used. Then, the aspirator after such a suction-filtering was stopped, and the iron powder on the filtering paper was recovered.

The recovered iron powder sample was placed in the drying machine with the temperature set to 10° C. in the static state and dried for 12 hours, under the atmospheric air. Then, after drying, the lump resulting from cohesion of the obtained iron powders was respectively slightly pulverized using the mortar, to thereby obtain the iron powder sample of this example.

After drying, it was found that the water content of the iron powder sample was 0.3%, the bulk density was 1.43 g/cm$^2$, and a BET value was 2.97 m$^2$/g. The plate ratio was 33.4.

The cis-DCE decomposition test described in examples 1 and 2, was performed using 0.5 g of the iron powder sample. Further, TCE decomposition test was performed under a similar condition.

The decomposition reaction rate constant of the cis-DCE of the iron powder sample was 0.107 [day$^{-1}$], and the decomposition reaction rate constant of TCE was 0.093 [day$^{-1}$].

Example 4

An operation similar to the operation of example 3 was performed excluding a point that a drying temperature was set to 40° C., to thereby obtain the iron powder sample of this example. Physical values are shown in table 2.

After drying, it was found that the water content of the iron powder sample was 0.2%, the bulk density was 0.92 g/cm$^2$, and the BET value was 3.09 m$^2$/g. The plate ratio was 31.2.

The decomposition reaction rate constant of the cis-DCE of the iron powder sample was 0.030 [day$^{-1}$], and the decomposition reaction rate constant of TCE was 0.044 [day$^{-1}$].

Comparative Example 3

The operation similar to the operation of example was performed excluding a point that the drying temperature was set to 105° C., to thereby obtain the iron powder sample of this example.

After drying, the water content of the iron powder sample was 0.2%, the bulk density was 0.71 g/cm$^2$, and the BET value was 3.24 m$^2$/g. The plate ratio was 29.1.

It was found that the decomposition reaction rate constant of the cis-DCE of the iron powder sample of comparative example 3 was 0.004 [day$^{-1}$], and the decomposition reaction rate constant of TCE was 0.008 [day$^{-1}$].

Conclusion of Examples 3, 4 and Comparative Example 3

Figure 1:
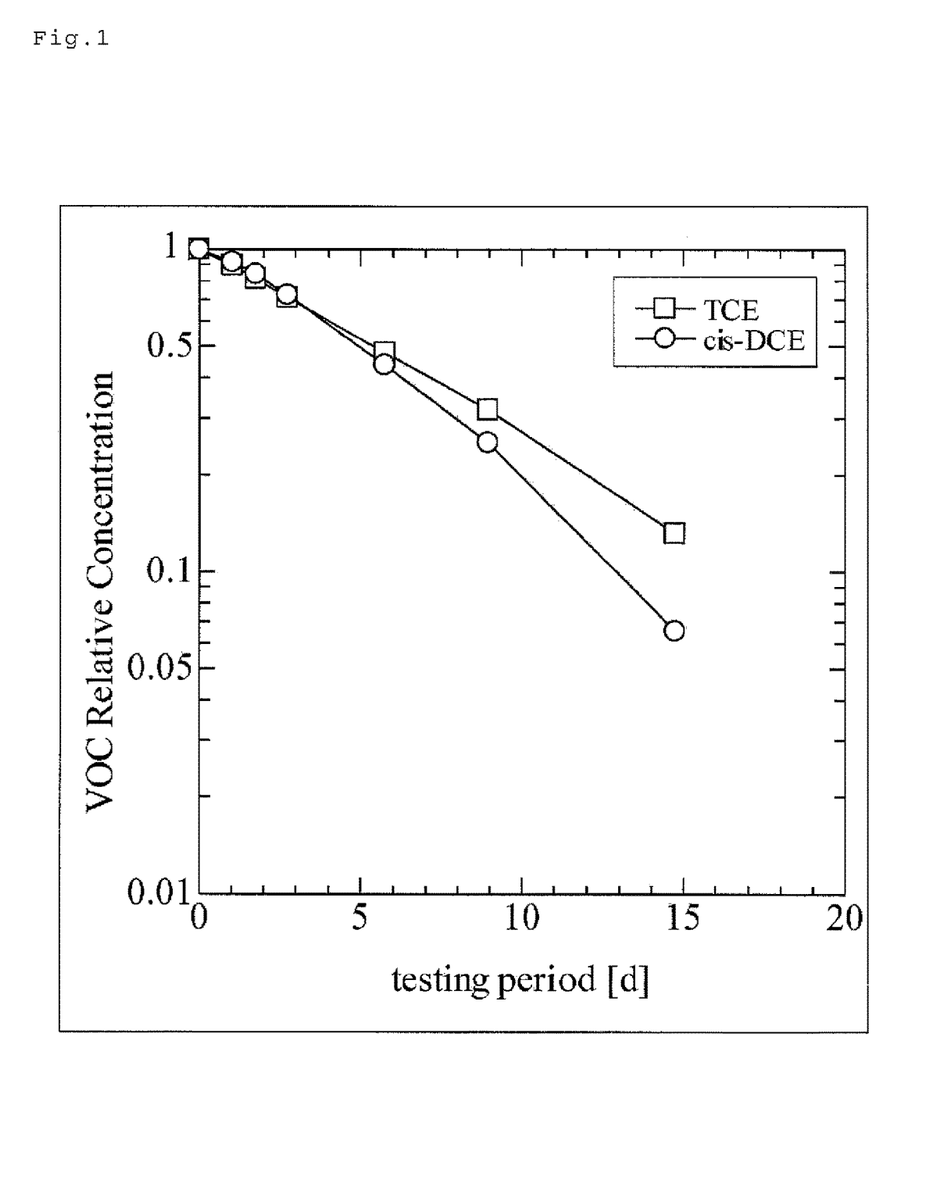
FIG. 1 is a graph showing a variation of a concentration of halogenated organic compounds with lapse of days, in organic halogen decomposition by a sample of the present invention.

FIG. 1 shows a graph of a variation of the concentration of the halogenated organic compound with lapse of times in the organic halogen decomposition by the sample of example 4. The vertical axis indicates the concentration of the halogenated organic compound (the concentration of the halogenated organic compounds at a test start time is standardized as 1, and the ratio of drop of the concentration with respect to this standard value is shown.), and the horizontal axis indicates the number of days, wherein the concentration of trichloroethylene (TCE) is plotted by □, and the concentration of cis-1, 2-dichloroethylene (cis-1, 2-DCE) is plotted by ○. From FIG. 1, it is found that the halogenated organic compound is rapidly decomposed by the iron powder.

Further, in the above-mentioned examples 3, 4, and comparative example 3, the concentration of DCE was traced until 15 days from start of the test, and the decomposition rate constant k was obtained. Results thereof were plotted in FIG. 2 by ●. Further, results of the test executed under the same condition, excluding a point that TCE was used instead of DCE, were plotted by ■ in FIG. 2. The vertical axis indicates values of k, and the horizontal axis indicates drying temperatures of the iron powder samples.

Figure 2:
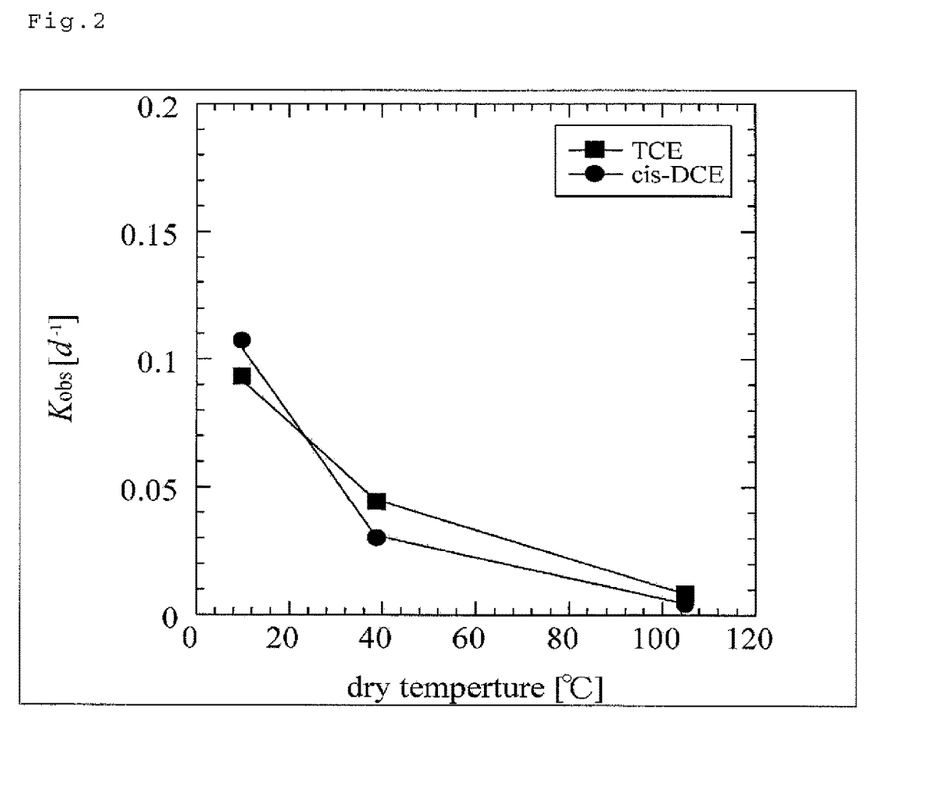
FIG. 2 and FIG. 3 are each a graph showing a decomposing reaction rate constant k of the halogenated organic compounds in the organic halogen decomposition by the sample of an example with different drying temperature.

From the results of FIG. 2, it is found that when the drying temperature is less than 40° C., a rising degree of the value of k is increased in the iron powder samples of examples 3, 4, and comparative example 3. From this result, it is found that a decomposition activity of the iron powder samples of examples 3, 4 for the halogenated organic compounds is increased by flattening and drying performed under a prescribed condition.

Example 5

Similar rotation processing as example 3 was performed using similar pot, ball, and iron powder as those of example 3, to thereby obtain the mixture slurry of the iron powder and water.

The obtained mixture slurry of the iron powder and water was subjected to suction-filtering using the Nutsche, the filtering bottle, and the similar aspirator as the aspirator of example 3, to thereby filter the iron powder on the filtering paper. Then, 100 ml of ethanol for industrial use was permeated into the iron powder remained on the filtering paper in a stage when the water was filtered, while continuing the suction, to thereby substitute the water remained in the iron powder by ethanol.

The recovered iron powder was placed in the static state, in a fixed temperature circulation type drying machine with temperature set to 10° C., under the atmospheric air, and was dried for 12 hours. Then, after drying, the lump resulting from cohesion of the obtained iron powder was respectively slightly pulverized using the mortar, to thereby obtain the iron powder sample of this example.

After drying, it was found that the water content of the iron powder sample was 0.3%, and the bulk density was 1.27 g/cm$^2$, and the BET value was 3.03 m$^2$/g. The plate ratio was 35.1.

It was found that the decomposition reaction rate constant of the cis-DCE of the iron powder sample was 0.185 [day$^{-1}$], and the decomposition reaction rate constant of TCE was 0.137 [day$^{-1}$].

Example 6

The iron powder sample of this example was obtained by performing the operation similar to the operation of example 5, excluding a point that the drying temperature was set to 40° C.

After drying, it was found that the water content of the iron powder sample was 0.2%, and the bulk density was 0.81 g/cm$^2$, and the BET value was 3.09 m$^2$/g. The plate ratio was 33.6.

The decomposition reaction rate constant of the cis-DCE of the iron powder sample was 0.019 [day$^{-1}$], and the decomposition reaction rate constant of TCE was 0.030 [day$^{-1}$].

Comparative Example 4

The operation similar to the operation of example was performed excluding a point that the drying temperature was set to 105° C., to thereby obtain the iron powder sample of this example.

After drying, it was found that the water content of the iron powder sample was 0.2%, and the bulk density was 0.67 g/cm$^2$, and the BET value was 3.32 m$^2$/g. The plate ratio was 31.8.

The decomposition reaction rate constant of the cis-DCE of the iron powder sample was 0.008 [day$^{-1}$], and the decomposition reaction rate constant of TCE was 0.015 [day$^{-1}$].

Conclusion of Examples 5, 6, and Comparative Example 4

In the above-mentioned examples 5, 6, and comparative example 4, the concentration of DCE was traced until 15 days from start of the test, and the decomposition rate constant k was obtained. Results thereof were plotted by ○ in FIG. 3. Further, the results of the test executed under the same condition, excluding a point that TCE was used instead of DCE, were plotted by □ in FIG. 3. The vertical axis indicates values of k, and the horizontal axis indicates drying temperatures of the iron powder samples.

Figure 3:
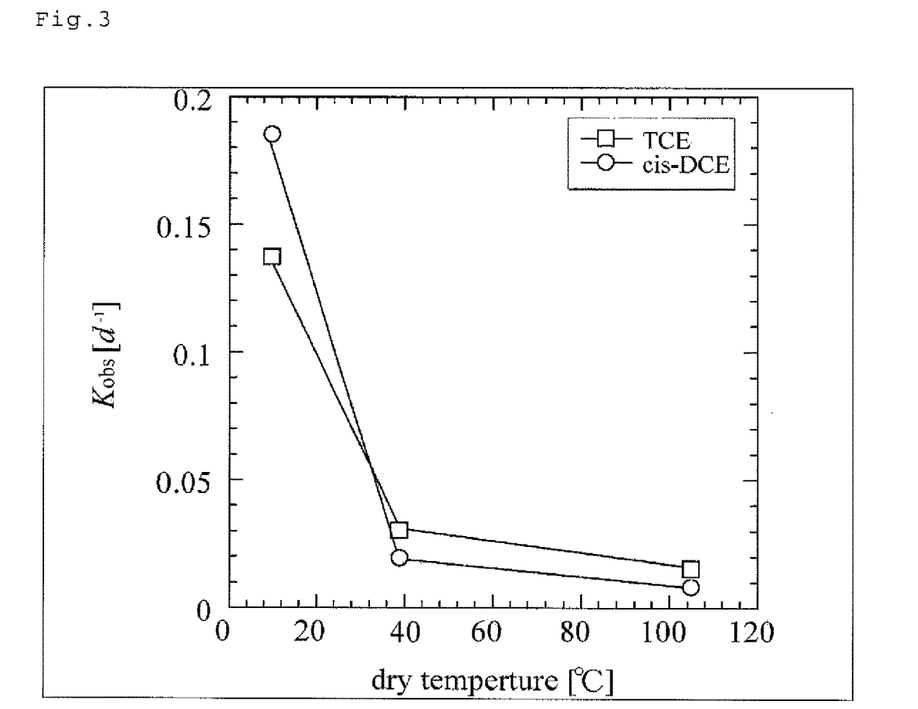

From the result of FIG. 3, it is found that when the drying temperature is less than 40° C., arising degree of the value of k is increased in the iron powder samples of examples 5, 6, and comparative example 4. From this result, it is found that the decomposition activity of the iron powder samples of examples 5, 6 for the halogenated organic compounds is increased by flattening and drying performed under a prescribed condition.

Comparative Example 5

Zirconia ($ZrO_2$) ball having a diameter of 10 mm was charged into a SUS304 pot having an internal volume of 2.3 L, by 80% volume portion of the pot volume (by 6580 g). Then, 100 g of the iron powder (reducing iron powder DKP-100 produced by DOWA IP Creation) was charged thereinto, and thereafter the pot was sealed by a rubber seal-attached lid, to thereby prepare the material.

The SUS pot into which the material was prepared, was placed on the pot mill rotation table, which was then driven and rotated at number of rotations of 120 rpm under each condition of 2, 5, 10, and 20 hours.

Contents of the SUS pot was taken out after the rotation processing, and was separated into $ZrO_2$ ball and the iron powder using a filter having the opening size of 5 mm, to thereby obtain the iron powder of this example. The drying processing was not performed.

The plate ratio of the obtained iron powder sample was 5.6/12.3/20.6/33.4 respectively, with respect to ball mill processing time 2/5/10/20 hours. Further, a similar TCE decomposition test as example 3 was executed, and results thereof were plotted by Δ in FIG. 4.

Figure 4:
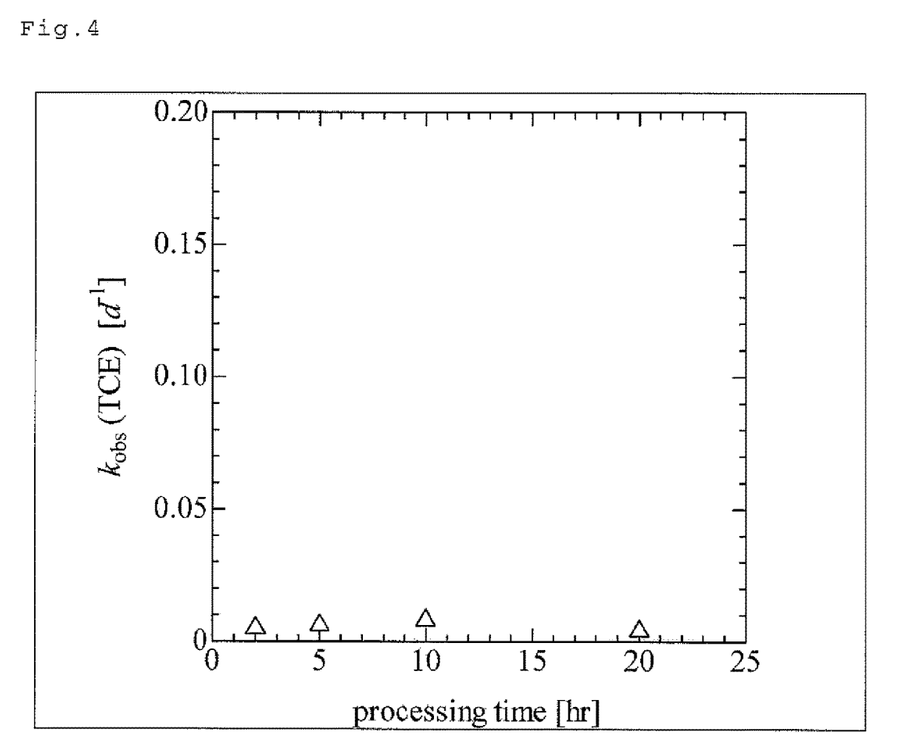
FIG. 4 is a graph showing a relation between the decomposing reaction rate constant k of the halogenated organic compounds in the organic halogen decomposition by a sample of a comparative example, and a rotation treatment time by a pot mill.

FIG. 4 is a graph showing a time-elapsed variation of the decomposition reaction rate constant k of TCE by the iron powder sample, wherein the horizontal axis indicates the rotation processing time by the pot mill, and the vertical axis indicates the TCE decomposition reaction rate constant k.

As is clarified from the results of FIG. 4, the TCE decomposition performance of the iron powder sample of this example stays at a low level, although the ball mill processing is executed using the pot mill similar to the pot mill used for the iron powder samples of examples 3 to 6.

Comparative Example 6

100 g of the iron powder (E-200 produced by DOWA IP Creation) having a particle size allowing not less than 50 wt % thereof to pass through the filter, being the iron powder having a specific area of approximately 20000 $cm^2/g$ and a carbon content of 0.2 wt %, and 1.27 g of copper oxide powder (CuO powder produced by Nikko Fine Chemicals Co, Ltd.) (corresponding to 0.8 g of Cu), were charged into a sample mixer (having an anchor-shaped impeller) having a volume of 300 mL.

After the above-mentioned iron powder and copper oxide powder were charged into the sample mixer, they were stirred for one minute, and at this point, 5 mL of 1M sulfuric acid was added into the mixer while continuing the stirring, and the stirring was continued for 20 seconds. Thereafter, the contents were taken out from the mixer, and were held in a drying furnace at 105° C., and a liquid component was separated by evaporation, to thereby obtain the iron powder sample of this example.

As a result of making the iron powder sample subjected to a similar DCE decomposition test as example 3, it was found that the decomposition rate constant of cis-DCE on fifteenth day, was k=0.104 [$day^{-1}$].

Comparative Example 7

100 g of the above-mentioned reducing iron powder (DKP-100) and 3.93 g of pentahydrate copper sulfate ($CuSO_4/5H_2O$: a reagent produced by Wako Pure Chemical Industries, Ltd.) were charged into the sample mixer having the volume of 300 mL (having the anchor-shaped impeller).

After the above-mentioned reducing iron powder and pentahydrate copper sulfate powder were charged into the sample mixer, they were stirred for one minute, to thereby obtain the iron powder sample of this example.

As a result of making the iron powder sample subjected to the similar TCE, DCE decomposition test as example 3, the TCE decomposition reaction rate constant and the DCE decomposition reaction rate constant were obtained as follows.

(TCE):$k$=0.12[$day^{-1}$]

(cis-DCE):$k$=0.14[$day^{-1}$]

CONCLUSION

It is found that the iron powder sample of example has the decomposition rate constant of cis-DCE equivalent to or higher than the decomposition rate constant of the iron powder sample of comparative example 6 containing copper oxide and based on a conventional technique.

It is also found that the iron powder sample of example 5 has more excellent TCE decomposition rate constant and cis-DCE decomposition rate constant, than those of the iron powder sample of comparative example 6 containing copper oxide and based on the conventional technique, and the iron powder sample of comparative example 7 containing a large amount of copper and based on the conventional technique.

The iron powder of the present invention is capable of efficiently decomposing the halogenated organic compounds in the soil, and a detailed reason therefore has not been clarified yet. However, the following reason can be considered by the inventors of the present invention.

1.) A contact efficiency between an active site and halogenated organic molecules on the surface of the iron particle is increased under coexistence of the iron particle and the organic halogen, by adjusting an oxidation state on the surface of the particle, such as a form of oxide (like FeO, $Fe_2O_3$, $Fe_3O_4$, etc.) and its existence ratio, thickness of an oxide layer, and change of a fine structure of a particle surface due to oxidation, etc.

2.) In addition to the above-mentioned 1, the iron powder particle is further crushed and elongated by plastic deformation, to thereby make an iron base material inside of the iron powder particle exposed to the surface, and make the shape of the iron powder particle deformed into a flat shape by this elongation, thus improving a specific area and improving the number of active sites per unit weight as powder.

According to the present invention, the iron powder for treating halogenated organic compounds not containing additives such as copper and having high decomposition power of decomposing the halogenated organic compounds, can be obtained. Then, use of such iron powder for treating halogenated organic compounds, can considerably contribute to cleaning the soil contaminated by the halogenated organic compounds.

In addition, in the manufacturing step of the present invention for manufacturing the iron powder for treating halogenated organic compounds, the step related to the additives can be omitted. Therefore, the manufacturing step can be simplified, and the environmental load can also be reduced in the manufacturing step at a soil cleaning time.

Moreover, according to the present invention, even in a case of a generally circulated iron powder, it can be used as a raw material, and therefore the iron powder can be selected from a wide range of a raw material supply source, which is effective for an industrial use.

INDUSTRIAL APPLICABILITY

When the iron powder of the present invention is applied to treatment of the contamination of the soil/underground water, various techniques can be considered. However, a typical method will be described hereafter.

<1> Application Example to the Soil (Original Position Treating Method)

The iron powder is evenly mixed into the soil using bawling equipment, so as to cover a soil contamination area which is found by a preliminary survey. After iron powder operation, sampling of the soil is suitably performed, and a concentration of contaminants is monitored, to thereby confirm a cleaning level. The cleaning is completed at a point when a set reference is achieved, like a case that a soil contamination level is below a soil environmental reference value over an entire operation area, or the soil in the contamination area is dug, the iron powder is evenly mixed on the ground, and a cleaning monitoring is performed, to thereby confirm whether the set reference is achieved, and an original place is embedded with the soil again.

<2> Application Example to Underground Water

Contaminated underground water pumped-up from the underground is passed through a column filled with the iron powder or a mixture of the iron powder and other filling material, and the contaminant in the underground water is dechlorinated in the column, to thereby release the treated water at an exist of the column, when satisfying the set reference of the soil contamination level which is below the soil environmental reference value, or the following method of cleaning the underground water by a permeable reaction wall method, can also be given for example: namely, the iron powder or the mixture of the iron powder and the filling material for improving permeability, are operated into a wall shape so that an underground water flow containing the contaminants (chlorine organic compounds) can pass through, and the contaminant in the underground water is decomposed in this permeable reaction wall, to thereby make the passed underground water set in a clean state.

The invention claimed is:

1. A method of producing iron powder for treating halogenated organic compounds, comprising:
    immersing iron powder in one or more organic solvents which have a lower vapor pressure than water and contain oxygen;
    performing solid-liquid separation for the iron powder immersed in the solvent, to thereby obtain the iron powder wet by this solvent; and
    applying drying treatment to the iron powder wet in the solvent, while keeping a temperature at less than 40° C.

2. The method of producing iron powder for treating halogenated organic compounds according to claim 1, wherein immersing the iron powder in one or more organic solvents which have a lower vapor pressure than water and contain oxygen, is performed after applying an acid treatment to the iron powder.

3. The method of producing iron powder for treating halogenated organic compounds according to claim 1, wherein the drying treatment is performed for 0.1 hours or more and 72 hours or less.

4. The method of producing iron powder for treating halogenated organic compounds according to claim 1, wherein the drying treatment is performed until a solvent weight is 0.5 mass % or less of an iron powder weight.

5. The method of producing iron powder for treating halogenated organic compounds according to claim 1, wherein iron powder having an average particle size of 1 μm or more and 500 μm or less, is used as the iron powder.

6. The method of producing iron powder for treating halogenated organic compounds according to claim 1, wherein iron powder with each particle having a flat shape with a flat ratio of 2 or more is used.

7. The method of producing iron powder for treating halogenated organic compounds according to claim 1, wherein the drying treatment is performed while keeping the temperature at 0° C. or more and 10° C. or less.

8. The method of producing iron powder for treating halogenated organic compounds according to claim 1, wherein in the immersing step, the iron powder is immersed in water and subsequently in the one or more organic solvents.

9. A method of cleaning soil/underground water, wherein the iron powder produced by the method of producing iron powder for treating halogenated organic compounds of claim 1, is mixed with soil or contacted with running water, the soil and the running water including the halogenated organic compounds.

* * * * *